(12) United States Patent
Kuwabara et al.

(10) Patent No.: US 8,173,186 B2
(45) Date of Patent: May 8, 2012

(54) CHOCOLATE DRAWING METHOD

(76) Inventors: Yuji Kuwabara, Wakayama (JP);
Akemi Kuwabara, Wakayama (JP)

( * ) Notice: Subject to any disclaimer, the term of this patent is extended or adjusted under 35 U.S.C. 154(b) by 775 days.

(21) Appl. No.: 12/281,407

(22) PCT Filed: Mar. 6, 2007

(86) PCT No.: PCT/JP2007/054763
§ 371 (c)(1),
(2), (4) Date: Sep. 2, 2008

(87) PCT Pub. No.: WO2007/105666
PCT Pub. Date: Sep. 20, 2007

(65) Prior Publication Data
US 2009/0169686 A1    Jul. 2, 2009

(30) Foreign Application Priority Data

Mar. 7, 2006  (JP) .................. 2006-104649

(51) Int. Cl.
*A23G 3/50* (2006.01)
*A23L 3/01* (2006.01)
*A23L 3/26* (2006.01)

(52) U.S. Cl. .... 426/104; 426/240; 426/238; 219/121.68

(58) Field of Classification Search .................. 426/104, 426/240, 237, 238; 219/121.68, 121.8, 121.61
See application file for complete search history.

(56) References Cited

FOREIGN PATENT DOCUMENTS

| | | |
|---|---|---|
| CN | 1565219 | 1/2005 |
| FR | 2621529 | 4/1989 |
| JP | 1-101848 | 4/1989 |
| JP | 1-108940 | 4/1989 |
| JP | 1-141552 | 6/1989 |
| JP | 2000-168157 | 6/2000 |
| JP | 2002-113585 | 4/2002 |
| JP | 2005-138140 | 6/2005 |

OTHER PUBLICATIONS

JP 1141552 A English abstract (pub. Jun. 2, 1989).*
CN 1565219 A English abstract (pub. Jan. 19, 2005).*
Machine Translation of JP 2000-168157, published Jun. 20, 2000.*
Machine Translation of CN 1565219, published Jan. 19, 2005.*
English language Abstract of JP 1-108940, Apr. 26, 1989.
English language Abstract of CN 1565219, Jan. 19, 2005.
English language Abstract of JP 1-141552, Jun. 2, 1989.
English language Abstract of JP 2002-113585, Apr. 16, 2002.
English language Abstract of JP 1-101848, Apr. 19, 1989.
English language Abstract of JP 2005-138140, Jun. 2, 2005.
English language Abstract of FR 2621529, Apr. 14, 1989.
English language Abstract of JP 2000-168157, Jun. 20, 2000.

* cited by examiner

*Primary Examiner* — Rena Dye
*Assistant Examiner* — Daniel Propster
(74) *Attorney, Agent, or Firm* — Greenblum & Bernstein P.L.C.

(57) ABSTRACT

A method of making a drawing on a chocolate by causing a pulsed laser to irradiate the surface of a solid chocolate under limited operation conditions, and a chocolate manufactured by said method are provided. The irradiation energy per pulse and the irradiation energy per sweeping unit line length of the pulsed laser are limited to a certain range. The trace of the laser irradiation remains circular or arc-shaped on the surface of the chocolate manufactured under the above conditions. Further, the method makes a drawing on the surface of the chocolate, using the phenomenon that chocolate changes color when being irradiated by a pulsed laser under the above operation conditions.

3 Claims, 1 Drawing Sheet

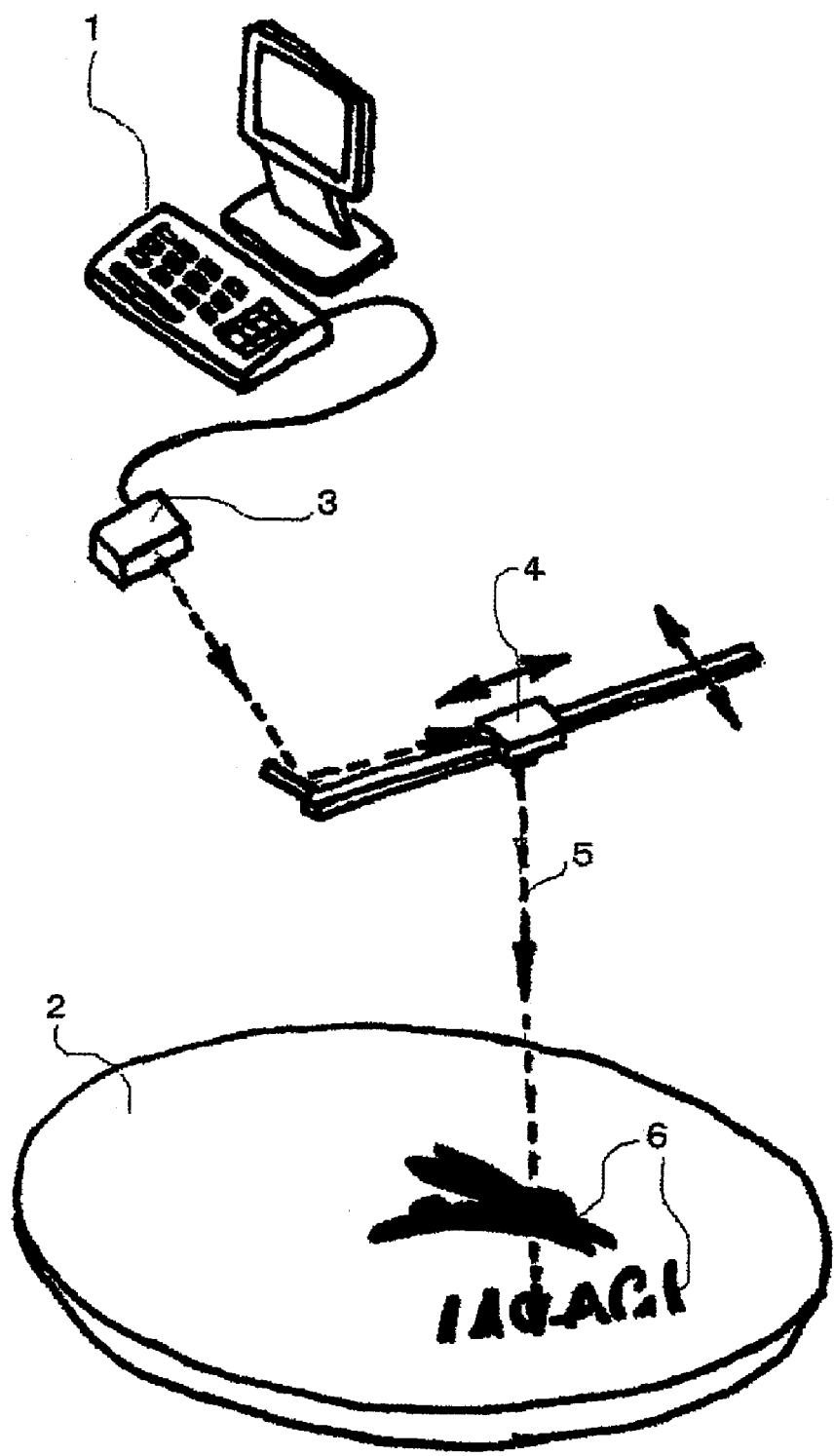

CHOCOLATE DRAWING METHOD

TECHNICAL FIELD

The present invention relates to a method of drawing a design such as a picture or a character on the surface of a chocolate, and to a chocolate manufactured by said method.

BACKGROUND ART

Conventionally, to draw a design such as a picture or a character on the surface of a solid chocolate, there is no other choice but to represent the design by hand, using chocolate of a different color or the like. A typical method first developed as a complementary technique therefor, and widely used, is a method using a mold. This mold method is for filling a mold, the surface of which has convex and concave portions thereon, with molten chocolate or the like and to allow the chocolate to set, thereby representing a picture or a character on the surface of the chocolate. The mold method, however, has the disadvantages that the method can be used only for high-volume production since it is necessary to form the mold in advance; that there are natural limits to the representation of fine lines and characters; and that it is difficult to read the picture or the character since there is no difference in the luster of the surface between the picture or character portion and the other portions.

In recent years, another widely used method directly prints a color on a chocolate by a printing process using edible ink. However, it is necessary to use another material besides the chocolate and it is also necessary to produce a transfer sheet in advance and the like. Thus this method is not suitable for high-mix low-volume production either.

In response, as a method of making a pattern appear on the surface of a chocolate cake, Japanese Laid-Open Patent Publication No. 1-141552 discloses a method of making a colored pattern appear by selectively heating the surface of a chocolate and thus by causing fat bloom. Since fat bloom, however, is caused by the crystals of fat spontaneously developing and coarsening over time, it is impossible to control fat bloom to be caused in a regular state, and thus the method cannot be used as a manufacturing method. Further, the method has a fatal disadvantage that in practice, the clarity of a picture or a character is lost when the crystals coarsen, and consequently the commercial value is reduced.

On the other hand, Japanese Laid-Open Patent Publication No. 1-108940 discloses a method of causing the focused beam of a laser light or the like to selectively irradiate and heat the surface of a thermoplastic food, and thus deforming the food by softening it or thus processing the food by performing mechanical deformation on this softened portion. In this method, however, the shapes of a picture or a character become unclear due to surface tension if several different operations are not performed instantaneously and continuously. Such operations, however, are virtually impossible in industry.

In addition, Japanese Laid-Open Patent Publication No. 2002-113585 discloses a method of: causing a laser light to irradiate a food on the surface of which an edible powder layer or a thin film layer made of an edible material having a lower melting point than the base is formed in advance; removing the powder layer or attaching the powder layer to the base, or melting the thin film layer; and thus forming a pattern by the difference in color from base chocolate. This method is widely used for industrial materials such as plastic, but when applied in practice to a chocolate, its operation process is complicated and it is difficult to even form the thin film layer on the chocolate with extremely high accuracy. Further, to completely remove the thin film layer, it is necessary to irradiate the thin film layer with extremely high laser energy, and consequently the food becomes scorched and bitter, and therefore has no commercial value as a food. Thus the method is unsuitable for practical use.

Further, when the surface of a chocolate is irradiated by a laser, the irradiated portion transpires and becomes concave. However, it is difficult to visually identify a design drawn merely by forming the concave portion on the surface of the chocolate. Particularly, a design drawn on the surface of a white chocolate is hardly visible, and unlike other common materials, a drawing cannot be easily viewable on a white chocolate merely by being engraved by laser irradiation.

Therefore, none of these conventional methods of making a drawing on a chocolate provides a method that is easy and suitable for low-volume production, without using any other materials and without impairing the taste or the flavor.

DISCLOSURE OF THE INVENTION

An object of the present invention is to provide a method of making a drawing on a chocolate, that is easy and suitable for low-volume production at low cost, without using any other materials and without impairing the taste or the flavor.

As a result of a diligent study to achieve the above object, the inventors have completed an intended method of making a favorable drawing on a chocolate by causing a laser light to irradiate the surface of a chocolate under limited and specific conditions.

That is, the present invention is a method of making a drawing on a chocolate, in which a design is drawn by generating a pulsed laser of which irradiation energy per pulse is in a range from 2.5E-08 to 4.0E-07 kcal/pulse and also irradiation energy per sweeping unit line length is in a range from 1.0E-05 to 2.0E-04 kcal/inch, to irradiate a surface of a solid chocolate while sweeping the pulsed laser, and thus forming a rough surface on the surface of the solid chocolate.

Further, the present invention is a chocolate in which, in an outline or main portion of the design drawn by causing the pulsed laser to irradiate the surface of the solid chocolate while sweeping the pulsed laser, and thus forming the rough surface on the surface of the solid chocolate, a trace of the pulsed laser irradiation remains circular or arc-shaped.

Furthermore, the present invention is the method of making a drawing on a chocolate, in which the design is drawn using a phenomenon that chocolate changes color when being irradiated by a pulsed laser.

Here, the values such as 1.0E-05 are represented in exponent notation. Further, the irradiation energy per pulse of the pulsed laser is a value calculated by dividing the laser output by the sweeping speed and by the number of pulses per sweeping unit line length, and the irradiation energy per sweeping unit line length is a value calculated by dividing the laser output by the sweeping speed.

Further, the solid chocolate is a chocolate that is solid at a room temperature and contains cocoa butter, sugar, cacao mass or milk solids, and the like, but may be a chocolate containing fat and food materials other than the above.

Based on the present invention, by using the feature that a suitable rough surface is formed on the surface of a solid chocolate by pulsed laser irradiation whereby the luster of the surface changes, it is possible to draw a fine and clear design, such as a picture or a character, virtually without changing the quality of the chocolate per se. Thus it is unnecessary to concurrently use auxiliary coloring agents or other food materials, or it is unnecessary to concurrently use mechanical means.

Further, in the outline or main portion of the design drawn by the pulsed laser irradiation according to the present invention, the trace of the laser irradiation remains in such a manner that circles or arcs, each 50 to 100 micrometers in diameter, are observed by a microscope. It is, however, impossible to visually identify the circles or the arcs, and thus the outline appears smooth.

Furthermore, the irradiation conditions of the laser to irradiate the chocolate and the storage temperature of the chocolate after the sweeping may be selected within a certain range whereby it is also possible to change the color of the drawn portion, and thus it is possible to draw a remarkably clear and beautiful design.

If a chocolate containing cacao mass is irradiated by a laser of relatively high energy within the range specified in the present invention and is thereafter preserved at a relatively high temperature for a period of time, only the engraved portion can become reddish brown colored several dozen minutes to several hours later. And the higher the storage temperature, the redder and brighter the engraved portion becomes, and thus it is possible to clearly represent the drawn design. The flavor of the chocolate, however, remains virtually unchanged, and so-called fat bloom is not caused.

In contrast, if a chocolate containing cacao mass is irradiated by a laser of relatively low energy within the range specified in the present invention and is thereafter preserved at a relatively low temperature for a period of time, it is possible to draw a design that appears gray-brown due to the change of luster.

On the other hand, if the surface of a white chocolate containing milk solids but not containing cacao mass is irradiated by the pulsed laser within the range specified in the present invention, a rough surface is formed and a Maillard reaction occurs at the same time. Thus it is possible to draw a light-brown design and it is also possible to adjust the color density of the design by changing the irradiation energy or the focal length of the laser. Consequently, it is possible to represent the design more clearly.

In addition, it is possible to arbitrarily and quickly set a picture or a character by changing the sweeping program of laser irradiation, and thus it is suitable for high-mix low-volume production.

BRIEF DESCRIPTION OF THE DRAWINGS

FIG. 1 is a schematic diagram showing a device for describing an embodiment of the present invention.

BEST MODE FOR CARRYING OUT THE INVENTION

An embodiment of the present invention will be described below.

Referring to FIG. 1, a chocolate 2, formed and set in advance, is placed in a carbon dioxide gas pulsed laser engraving device, and the chocolate 2 is irradiated by a laser light 5 by controlling a laser sweeping apparatus 4 and a laser light-emitting section 3 in accordance with image information set in advance in a control device 1, thereby making a drawing 6, such as a picture or a character, approximately 0.01 to 0.1 mm deep. The laser used is a pulsed laser of which the rated output is 36 W, the sweeping speed is set to 40.5 inch/second, the number of pulses per sweeping unit line length is set to 500 pulses/inch, and the output is set to 75% of the rated output, such that the irradiation energy per pulse is 3.2E-07 kcal/pulse and also the irradiation energy per sweeping unit line length is 1.6E-04 kcal/inch.

The chocolate used is a chocolate containing cacao mass, that forms stable crystals by being aged at a certain temperature for a certain period of time after being formed and set. Further, to engrave a picture or a character more clearly, the temperature of the chocolate is set to 10 to 20° C. in advance. Immediately after an engraving is made, the chocolate is placed at a temperature of approximately 20° C. for 10 to 120 minutes.

In this embodiment, as a result of a diligent study, it is confirmed in experiments by the inventors that sometime after the laser irradiation, the irradiated portion becomes reddish brown colored, and thus a clear design is drawn on the surface of the chocolate. Although the mechanism of becoming reddish brown colored has not been elucidated, this phenomenon cannot be experienced in a conventional chocolate manufacturing process. Further, fat bloom is not caused, and there is no particular change in the flavor, which remains virtually unchanged for at least 1 to 2 months.

As another embodiment, laser irradiation is performed in such a manner that a pulsed laser of which the rated output is 36 W is used, the sweeping speed is set to 31.5 inch/second, the number of pulses per sweeping unit line length is set to 500 pulses/inch, and the output is set to 10% of the rated output, such that the irradiation energy per pulse is 5.5E-08 kcal/pulse and also the irradiation energy per sweeping unit line length is 2.7E-05 kcal/inch. Immediately after a drawing is made, the chocolate is placed at a stable temperature lower than 20° C. for 1 to 2 days.

In this embodiment, it is confirmed that an extremely shallow rough surface is formed in the laser-irradiated portion whereby the drawn portion becomes gray-brown colored due to the change of the luster thereof, and thus the design is clearly visible. Therefore, by this method, it is more effective to draw a design by causing the laser to irradiate a lustrous molded surface of a chocolate, formed and set in advance by a mold and a conveyor.

It is confirmed in experiments by the inventors that the design drawn on the surface of the chocolate in this embodiment shows as gray-brown regardless of the storage temperature, and that if the chocolate is preserved at a stable temperature for the above period of time, the color remains virtually unchanged thereafter and fat bloom is not caused.

As yet another embodiment, laser irradiation is performed in such a manner that a pulsed laser of which the rated output is 36 W is used, the sweeping speed is set to 33.8 inch/second, the number of pulses per sweeping unit line length is set to 500 pulses/inch, and the output is set to 40%, such that the irradiation energy per pulse is 2.0E-07 kcal/pulse and also the irradiation energy per sweeping unit line length is 1.0E-04 kcal/inch. In this embodiment, if the chocolate is placed at lower than approximately 10° C. for 1 to 2 days immediately after the laser irradiation, the laser-irradiated portion remains chocolate colored and the color remains virtually unchanged thereafter.

In this embodiment, if the chocolate is preserved at a storage temperature of 20° C. or higher for 1 to 2 days after the laser processing, the laser-irradiated portion slowly changes color and gradually becomes reddish brown colored with the passage of time.

As yet another embodiment, a white chocolate containing milk solids but not containing cacao mass is used, and laser irradiation is performed in such a manner that a pulsed laser of which the rated output is 36 W is used, the sweeping speed is set to 31.5 inch/second, the number of pulses per sweeping unit line length is set to 500 pulses/inch, and the output is set to 65% of the rated output, such that the irradiation energy per pulse is 3.6E-07 kcal/pulse and also the irradiation energy per sweeping unit line length is 1.8E-04 kcal/inch. In this embodiment, in the laser-irradiated portion, a rough surface is formed and a Maillard reaction occurs at the same time. As a result, a bright light-brown design is instantaneously drawn on the surface of the white chocolate and also a more favorable flavor is produced due to the Maillard reaction. In this case, it is also possible to change the degree of coloration and the degree of flavor, adjusting the intensity of the Maillard reaction by shifting the focal length of the laser light slightly from the surface of the chocolate.

The present invention will be specifically described below with the following examples, but examples of the present invention are not limited thereto.

If the irradiation energy of the laser is too high, the chocolate becomes scorched. However, on the other hand, if the irradiation energy is insufficient, it is impossible to make a suitable engraving on the chocolate. If the irradiation energy of the laser is insufficient, the irradiation energy is less than the energy required for the irradiated portion of the chocolate to transpire, and thus it is impossible for the irradiated portion to form a clear drawing. Table 1 shows the main results of the examples confirmed by the inventors by experimentation. The following examples all correspond to the operation results shown in the Table 1.

Example 1

A pulsed laser of which the rated output is 36 W is used, the sweeping speed is set to 40.5 inch/second, the number of pulses per sweeping unit line length is set to 500 pulses/inch, and the output is set to 75% of the rated output, such that the irradiation energy per pulse is 3.2E-07 kcal/pulse and also the irradiation energy per sweeping unit line length is 1.6E-04 kcal/inch.

A chocolate containing cacao mass is used and the temperature of the chocolate is set to 18° C. in advance. The chocolate is irradiated by the laser under the above operation conditions and immediately thereafter placed at a temperature of approximately 20° C. for 30 minutes.

In this embodiment, as indicated by 5) of table 1, it is possible to make a particularly favorable drawing. The laser-irradiated portion becomes reddish brown colored, fat bloom is not caused, and there is no particular change in the flavor.

Comparative Example 1

A chocolate similar to that used in the above example is used, the operation temperature is also similar to that of the above example, and the irradiation conditions of the laser is set as follows: the sweeping speed is 31.5 inch/second; the number of pulses per sweeping unit line length is 500 pulses/inch; and the output is 85%. As a result, as indicated by 6) of table 1, the laser-irradiated portion becomes scorched and the state of the drawing is unfavorable.

Example 2

A chocolate containing cacao mass is used, and the laser of which the rated output is 36 W is set as follows: the sweeping speed is 31.5 inch/second; the number of pulses per sweeping unit line length is 500 pulses/inch; and the output is 10%. As a result of making a drawing on the chocolate under the above laser sweeping conditions and leaving the chocolate at a room temperature of 20° C. for a day, as indicated by 10) of table 1, it is possible to make a particularly favorable drawing.

Comparative Example 2

A chocolate containing cacao mass, similar to that used in example 2, is used, and the laser is set as follows: the sweeping speed is 45 inch/second; the number of pulses per sweeping unit line length is 500 pulses/inch; and the output is 6%. As a result of making a drawing on the chocolate under the above laser sweeping conditions and leaving the chocolate at a room temperature of 20° C. for a day, as indicated by 14) of table 1, the drawing is unclear and unfavorable.

Example 3

A white chocolate containing milk solids but not containing cacao mass is used, and laser irradiation is performed in such a manner that a pulsed laser of which the rated output is 36 W is used, the sweeping speed is set to 31.5 inch/second, the number of pulses per sweeping unit line length is set to 500 pulses/inch, and the output is set to 65% of the rated output, such that the irradiation energy per pulse is 3.6E-07 kcal/pulse and also the irradiation energy per sweeping unit line length is 1.8E-04 kcal/inch.

As a result, as indicated by 4) of table 1, it is possible to make a particularly favorable drawing.

Comparative Example 3

A white chocolate similar to that used in example 3 is used, and the laser is set as follows: the sweeping speed is 18 inch/second; the number of pulses per sweeping unit line length is 500 pulses/inch; and the output is 50%. As a result, as indicated by 3) of table 1, the drawn portion becomes slightly scorched and the quality is unfavorable.

TABLE 1

| Laser Condition Setting | Irradiation Energy per Pulse kcal/pulse | Irradiation Energy per Sweeping Unit Line Length kcal/inch | Quality Evaluation |
|---|---|---|---|
| 1) | 4.9E−07 | 2.4E−04 | unfavorable (slightly scorched) |
| 2) | 3.4E−07 | 1.7E−04 | favorable |
| 3) | 4.8E−07 | 2.4E−04 | unfavorable (slightly scorched) |
| 4) | 3.6E−07 | 1.8E−04 | white: particularly favorable |
| 5) | 3.2E−v07 | 1.6E−04 | particularly favorable |
| 6) | 4.6E−07 | 2.3E−04 | unfavorable (slightly scorched) |
| 7) | 2.0E−07 | 1.0E−04 | particularly favorable |
| 8) | 1.4E−07 | 6.9E−05 | favorable |
| 9) | 3.8E−08 | 1.9E−05 | favorable |
| 10) | 5.5E−08 | 2.7E−05 | particularly favorable |
| 11) | 7.7E−08 | 2.7E−05 | favorable |
| 12) | 1.2E−07 | 4.1E−05 | favorable |
| 13) | 1.9E−08 | 9.6E−06 | unfavorable (unclear) |
| 14) | 2.3E−08 | 1.1E−05 | unfavorable (unclear) |
| 15) | 2.7E−08 | 1.3E−05 | favorable |
| 16) | 4.5E−08 | 2.2E−05 | favorable |

TABLE 1-continued

| Laser Condition Setting | Irradiation Energy per Pulse kcal/pulse | Irradiation Energy per Sweeping Unit Line Length kcal/inch | Quality Evaluation |
|---|---|---|---|
| 17) | 2.2E−08 | 1.1E−05 | unfavorable (unclear) |
| 18) | 2.7E−08 | 1.3E−05 | favorable |

INDUSTRIAL APPLICABILITY

As described above, if a method according to the present invention is used as a method of making a drawing on a chocolate, it is possible to make a drawing on a chocolate, that is easy and suitable for low-volume production, without using any other materials such as coloring agents or chocolate of a different color, without impairing the taste or the flavor, and with a freedom of design.

The invention claimed is:

1. A method of drawing a design on a surface of a solid chocolate, comprising:
drawing a design on the surface of the solid chocolate by irradiating the surface of the solid chocolate with a pulsed laser while sweeping the pulsed laser in which irradiation energy per pulse is in a range from 2.7E-8 to 3.6E-7 kcal/pulse, and irradiation energy per sweeping unit line length is in a range from 1.3E-5 to 1.8E-4 kcal/inch, to form a rough surface forming a pattern or character on the solid chocolate.

2. A chocolate processed by the method of drawing a design on a surface of a solid chocolate according to claim 1,
wherein, a trace of the pulsed laser irradiation remains circular or arc-shaped in an outline or main portion of the design drawn by causing the pulsed laser to irradiate the surface of the solid chocolate while sweeping the pulsed laser, and forming the rough surface forming a pattern or character on the surface of the solid chocolate.

3. The method of drawing a design on a surface of a solid chocolate according to claim 1,
wherein the design is drawn using a phenomenon that chocolate changes color when being irradiated by a pulsed laser.

* * * * *